(12) United States Patent
Hong et al.

(10) Patent No.: US 11,299,419 B2
(45) Date of Patent: Apr. 12, 2022

(54) UV-RESISTANT AND ALKALINE-RESISTANT BOROSILICATE GLASS AND USE THEREOF

(71) Applicant: DONGGUAN HEC PHARM R&D CO., LTD., Guangdong (CN)

(72) Inventors: Weiqiang Hong, Dongguan (CN); Xinqian He, Dongguan (CN); Yong Jiang, Dongguan (CN); Zhengshang Zhou, Dongguan (CN); Lianying Zhu, Dongguan (CN); Zhiyong Li, Guangdong (CN); Fangfang Huang, Guangdong (CN)

(73) Assignee: Sunshine Lake Pharma Co., Ltd., Guangdong (CN)

(*) Notice: Subject to any disclaimer, the term of this patent is extended or adjusted under 35 U.S.C. 154(b) by 155 days.

(21) Appl. No.: 16/755,600

(22) PCT Filed: Oct. 19, 2018

(86) PCT No.: PCT/CN2018/111039
§ 371 (c)(1),
(2) Date: Apr. 13, 2020

(87) PCT Pub. No.: WO2019/080776
PCT Pub. Date: May 2, 2019

(65) Prior Publication Data
US 2021/0188697 A1    Jun. 24, 2021

(30) Foreign Application Priority Data
Oct. 24, 2017 (CN) .......................... 201710998365.1

(51) Int. Cl.
| | | |
|---|---|---|
| *C03C 3/089* | (2006.01) |
| *C03C 3/091* | (2006.01) |
| *C03C 3/095* | (2006.01) |
| *C03C 4/20* | (2006.01) |
| *C03C 4/08* | (2006.01) |
| *A61J 1/14* | (2006.01) |
| *B65D 85/84* | (2006.01) |
| *C03C 8/02* | (2006.01) |
| *C03C 8/04* | (2006.01) |
| *C03C 8/24* | (2006.01) |

(52) U.S. Cl.
CPC ............. *C03C 3/095* (2013.01); *A61J 1/1468* (2015.05); *B65D 85/84* (2013.01); *C03C 4/085* (2013.01); *C03C 4/20* (2013.01); *C03C 8/02* (2013.01); *C03C 8/04* (2013.01); *C03C 8/24* (2013.01); *C03C 2204/00* (2013.01); *C03C 2207/00* (2013.01)

(58) Field of Classification Search
CPC ........... C03C 3/095; C03C 4/085; C03C 4/20; C03C 8/02; C03C 8/04; C03C 8/24; C03C 2204/00; C03C 2207/00; A61J 1/1468; B65D 85/84
See application file for complete search history.

(56) References Cited

U.S. PATENT DOCUMENTS

| | | | |
|---|---|---|---|
| 6,204,212 | B1 | 3/2001 | Kunert et al. |
| 6,794,323 | B2 | 9/2004 | Peuchert et al. |
| 7,951,312 | B2 | 5/2011 | Ott et al. |
| 9,643,882 | B2 | 5/2017 | Tratzky et al. |
| 2003/0087745 | A1 | 5/2003 | Peuchert et al. |
| 2004/0113237 | A1 | 6/2004 | Kass et al. |
| 2007/0270300 | A1 | 11/2007 | Kurachi et al. |
| 2016/0107924 | A1 | 4/2016 | Yamamoto et al. |
| 2016/0284875 | A1* | 9/2016 | Tsukagoshi ....... H01L 31/02002 |
| 2018/0186688 | A1* | 7/2018 | Zhang .................... C03C 3/095 |

FOREIGN PATENT DOCUMENTS

| | | |
|---|---|---|
| CN | 104261676 A | 1/2015 |
| CN | 104556689 A | 4/2015 |
| WO | 2014196655 | 12/2014 |

OTHER PUBLICATIONS

International Search Report of PCT/CN2018/111039.
Written Opinion of PCT/CN2018/111039.
English Abstract of CN104261676.
English Abstract of CN 104556689.
English translation of Written Opinion of PCT/CN2018/111039.

* cited by examiner

*Primary Examiner* — Karl E Group
*Assistant Examiner* — Cameron K Miller
(74) *Attorney, Agent, or Firm* — Kam Wah Law

(57) ABSTRACT

Disclosed is a type of borosilicate glass, the composition of which, based on oxides, contains the following components by weight percentage (wt %): 2.0 wt %-5.0 wt % of $TiO_2$, 0.25 wt %-2.5 wt % of $CeO_2$ and 0.25 wt %-3.0 wt % of $Y_2O_3$, and does not contain any iron compound, such as ferric oxide. The glass has better UV resistance and alkaline resistance properties, and a better light transmission rate, and is particularly suitable for use in the field of pharmaceutical packaging materials.

19 Claims, No Drawings

UV-RESISTANT AND ALKALINE-RESISTANT BOROSILICATE GLASS AND USE THEREOF

CROSS-REFERENCE TO RELATED APPLICATIONS

This is a U.S. national stage application of the International Patent Application No. PCT/CN2018/111039, filed Oct. 19, 2018, which claims priority to Chinese Patent Application No. 201710998365.1, filed Oct. 24, 2017, both of which are incorporated herein by reference in their entirety.

FIELD OF THE INVENTION

The invention relates to an UV-resistant and alkaline-resistant borosilicate glass and uses thereof.

BACKGROUND

In recent years, more and more basic drugs (such as pH≥10) have been used in the pharmaceutical market. Glass containers used that do not meet the alkali resistance requirements are prone to glass peeling. For some ultraviolet-sensitive drugs, ultraviolet radiation tends to affect the stability of the drug performance Therefore, there is a need for packaging materials with significantly improved alkali resistance and ultraviolet resistance.

Borosilicate glass is particularly widely used in the pharmaceutical packaging industry due to its high chemical stability, high thermal shock resistance, and low coefficient of linear thermal expansion.

When borosilicate glass is used as a primary packaging material for drugs such as ampoules or vials, the glass is required to have very high corrosion resistance to acidic and alkaline media and water resistance. So far, the known industrial pharmaceutical ampoule glass has a HGB class 1 water resistance (H, according to YBB00362004-2015, water resistance measurement method and classification method for glass particles at 98° C., corresponding to "DIN ISO 719"), class 1 acid resistance (S, according to YBB00342004-2015, methods for measuring and classifying corrosion resistance of glass to boiling hydrochloric acid, corresponding to "DIN 12116") and class 2 alkali resistance (L, according to YBB00352004-2015, methods for measuring and classifying corrosion resistance of glass to boiling aqueous solution of an alkali mixture, corresponding to "DIN ISO 695"). The representative of the prior art is transparent glass FIOLAX™. However, practical experience shows that to ensure the alkali resistance of the final product in the production process, it is required to develop in the laboratory a glass with a weight loss of less than 75 mg/dm$^2$, that is, a glass in the class 1 alkali resistance range which can meet this requirement without impairing other important glass properties, such as maintaining HGB class 1 water resistance and class 1 acid resistance.

In order to make the glass have anti-ultraviolet performance, the prior art usually adopts brown, tawny or amber neutral borosilicate glass. These glasses have good chemical stability, mechanical strength and impact resistance, and high ultraviolet cutoff rate. However, these glasses often contain iron compounds, such as ferric oxide, which have general alkali resistance and cannot meet the requirements of both ultraviolet resistance and alkali resistance.

Although the prior patent literature discloses glass with high chemical resistance, there are still needs for further glass improvements, particularly, it is necessary to simultaneously improve its alkali resistance and ultraviolet resistance.

SUMMARY

Provided herein is a borosilicate glass comprising the following constituents based on oxide by weight percentage (wt %): 2.0-5.0 wt % of $TiO_2$, 0.25-2.5 wt % of $CeO_2$ and 0.25-3.0 wt % of $Y_2O_3$, wherein the borosilicate glass is free of an iron compound, such as ferric oxide.

In some embodiments, the borosilicate glass provided herein comprises the following constituents based on oxide by weight percentage (wt %): 2.0-5.0 wt % of $TiO_2$, 0.25-2.5 wt % of $CeO_2$ and 0.25-3.0 wt % of $Y_2O_3$; and the total amount of $SiO_2$ (silica), $TiO_2$ and $CeO_2$ is not less than 72.0 wt %; wherein the borosilicate glass is free of an iron compound such as ferric oxide.

In some embodiments, the borosilicate glass provided herein comprises the following constituents based on oxide by weight percentage (wt %): 2.0-5.0 wt % of $TiO_2$, 0.25-2.5 wt % of $CeO_2$, 0.25-3.0 wt % of $Y_2O_3$, 65.0-75.0 wt % of $SiO_2$, 6.0-12.0 wt % of $B_2O_3$ (boron trioxide), 3.5-6.5 wt % of $Al_2O_3$ (aluminum oxide); and the total amount of $Na_2O$ (sodium oxide), $K_2O$ (potassium oxide) and $Li_2O$ (lithium oxide) is 5.5-9.5 wt %; and the total amount of CaO (calcium oxide), MgO (magnesium oxide) and BaO (barium oxide) is 1.0-5.5 wt %; wherein the borosilicate glass is free of an iron compound such as ferric oxide.

In some embodiments, the borosilicate glass provided comprises the following constituents based on oxide by weight percentage (wt %): 2.0-5.0 wt % of $TiO_2$, 0.5-1.5 wt % of $CeO_2$ and 0.25-3.0 wt % of $Y_2O_3$; wherein the borosilicate glass is free of an iron compound such as ferric oxide.

In some embodiments, the borosilicate glass provided comprises at least one of $ZrO_2$, ZnO and $La_2O_3$ in an amount from 0-1.0 wt %.

In some embodiments, the borosilicate glass provided comprises or has the following constituents based on oxide by weight percentage (wt %):

| | |
|---|---|
| $SiO_2$ | 65.0-75.0 wt %, |
| $B_2O_3$ | 6.0-12.0 wt %, |
| $Al_2O_3$ | 3.5-6.5 wt %, |
| $Na_2O$ | 4.5-8.5 wt %, |
| $K_2O$ | 0-2.5 wt %, |
| $Li_2O$ | 0-1.0 wt %, |
| wherein $\Sigma(Na_2O + K_2O + Li_2O)$ | 5.5-9.5 wt %, |
| CaO | 0.5-3.5 wt %, |
| MgO | 0-1.0 wt %, |
| BaO | 0-2.0 wt %, |
| wherein $\Sigma(CaO + MgO + BaO)$ | 1.0-5.5 wt %, |
| $TiO_2$ | 2.0-5.0 wt %, |
| $CeO_2$ | 0.25-2.5 wt %, |
| NaCl | 0-1.0 wt %, |
| $Y_2O_3$ | 0.25-3.0 wt %, |
| $ZrO_2$ | 0-4.0 wt %, |
| ZnO | 0-2.0 wt %, and |
| $La_2O_3$ | 0-2.0 wt %. |

In some embodiments, the borosilicate glass provided by the present invention comprises or has the following constituents based on oxide by weight percentage (wt %):

| | |
|---|---|
| $SiO_2$ | 65.0-75.0 wt %, |
| $B_2O_3$ | 6.0-12.0 wt %, |

-continued

| | |
|---|---|
| Al$_2$O$_3$ | 3.5-6.5 wt %, |
| Na$_2$O | 4.5-8.5 wt %, |
| K$_2$O | 0-2.5 wt %, |
| Li$_2$O | 0-1.0 wt %, |
| wherein Σ(Na$_2$O + K$_2$O + Li$_2$O) | 5.5-9.5 wt %, |
| CaO | 0.5-3.5 wt %, |
| MgO | 0-1.0 wt %, |
| BaO | 0-2.0 wt %, |
| wherein Σ(CaO + MgO + BaO) | 1.0-5.5 wt %, |
| TiO$_2$ | 2.0-5.0 wt %, |
| CeO$_2$ | 0.25-2.5 wt %, |
| NaCl | 0-1.0 wt %, |
| Y$_2$O$_3$ | 0.25-3.0 wt %, |
| ZrO$_2$ | 0-4.0 wt %, |
| ZnO | 0-2.0 wt %, and |
| La$_2$O$_3$ | 0-2.0 wt %, |
| wherein Σ(SiO$_2$+ TiO$_2$+ CeO$_2$) | ≥72.0 wt %. |

In some embodiments, the borosilicate glass provided by the present invention comprises or has the following constituents based on oxide by weight percentage (wt %):

| | |
|---|---|
| SiO$_2$ | 68.5-72.5 wt %, |
| B$_2$O$_3$ | 8.0-10.0 wt %, |
| Al$_2$O$_3$ | 4.1-5.9 wt %, |
| Na$_2$O | 5.5-7.0 wt %, |
| K$_2$O | 0-1.0 wt %, |
| Li$_2$O | 0-0.5 wt %, |
| wherein Σ(Na$_2$O + K$_2$O + Li$_2$O) | 6.0-8.0 wt %, |
| CaO | 1.0-1.8 wt %, |
| MgO | 0-0.8 wt %, |
| BaO | 0.4-1.0 wt %, |
| wherein Σ(CaO + MgO + BaO) | 1.5-3.0 wt %, |
| TiO$_2$ | 2.0-3.5% wt %, |
| CeO$_2$ | 0.5-1.5 wt %, |
| NaCl | 0-0.5 wt %, |
| Y$_2$O$_3$ | 0.5-2.0 wt %, |
| ZrO$_2$ | 0-2.0 wt %, |
| ZnO | 0-1.0 wt %, and |
| La$_2$O$_3$ | 0-1.0 wt %. |

In some embodiments, the borosilicate glass provided by the present invention is free of As$_2$O$_3$ and Sb$_2$O$_3$ apart from inevitable impurities.

In some embodiments, the glass provided herein has an ultraviolet-visible light transmittance T %<10% when the wavelength is ≤380 nm and a class 1 alkali resistance according to YBB00352004-2015.

In some embodiments, the glass provided herein has an ultraviolet-visible light transmittance T %<10% when the wavelength is ≤380 nm, a class 1 alkali resistance according to YBB00352004-2015, a class 1 water resistance according to YBB00362004-2015 and a class 1 acid resistance according to YBB00342004-2015.

In some embodiments, the glass provided by the invention is particularly suitable for use as a pharmaceutical packaging material.

In some embodiments, the glass provided by the invention is particularly suitable for use as a container and/or a chemical device for chemically corrosive liquid.

In some embodiments, the glass provided by the present invention is particularly suitable for use as a glass-metal sealing glass, such as sealing metal molybdenum, KOVAR, and the like.

DETAILED DESCRIPTION OF THE INVENTION

To this end, the present invention provides a borosilicate glass, according to the YBB00352004-2015 test, having a weight loss of less than 75 mg/dm$^2$, reaching class 1 alkali resistance (L) while maintaining HGB class 1 water resistance (H) and class 1 acid resistance (S), and having a good UV resistance. At the wavelength ≤380 nm, the UV-visible light transmittance T % is less than 10%. In addition, a coefficient of linear thermal expansion of the glass provided by the present invention is from 4.4×10$^{-6}$/K to 5.8×10$^{-6}$/K, which has a high thermal shock resistance and a good processability. Moreover, the glass provided by the present invention has a processing temperature ($V_A$) lower than 1300° C., and a suitable or relatively low transition temperature ($T_g$), which is beneficial to the production of the glass.

The inventors found that adding Fe$_2$O$_3$ (ferric oxide) to the glass helps to improve the UV resistance of the glass, but it is not conducive to the improvement of alkali resistance. Adding ferric oxide remarkably reduces the alkali resistance of glass. While adding an appropriate amount of TiO$_2$ (titanium dioxide) or CeO$_2$ (cerium dioxide) to the glass alone can improve the UV resistance of the glass, but it is difficult to meet the requirement of the transmittance T % being less than 10% at a wavelength ≤380 nm. In the case of not using iron compounds (such as Fe$_2$O$_3$), using an appropriate amount of TiO$_2$ and an appropriate amount of CeO$_2$ can improve the UV resistance of the glass and meet the requirements of the transmittance T % being less than 10% at a wavelength ≤380 nm. When an appropriate amount of TiO$_2$ and an appropriate amount of CeO$_2$ are used to make the glass having good UV resistance and transmittance, using an appropriate amount of Y$_2$O$_3$ (yttrium oxide) can make the glass have a good UV resistance, a good transmittance, as well as a good alkali resistance; and reach class 1 alkali resistance. However, if the amount of TiO$_2$, CeO$_2$ and/or Y$_2$O$_3$ cannot meet the requirements within certain ranges, it is difficult for the obtained glass to meet the requirements of good UV resistance, good transmittance and good alkali resistance.

According to examples of the present invention, the borosilicate glass provided by the present invention comprises the following constituents based on oxide by weight percentage (wt %): 2.0-5.0 wt % of TiO$_2$, 0.25-2.5 wt % of CeO$_2$ and 0.25-3.0 wt % of Y$_2$O$_3$, and is free of an iron compound, such as ferric oxide.

According to examples of the present invention, in some embodiments, the borosilicate glass provided by the present invention comprises the following constituents based on oxide by weight percentage (wt %): 2.0-5.0 wt % of TiO$_2$, 0.25-2.5 wt % of CeO$_2$ and 0.25-3.0 wt % of Y$_2$O$_3$; and the total amount of SiO$_2$ (silica), TiO$_2$ and CeO$_2$ is not less than 72.0 wt %; wherein it is free of an iron compound such as ferric oxide. The glass provided can have relatively good UV resistance, and/or alkali resistance, and/or good light transmittance.

In some embodiments, the borosilicate glass provided by the present invention comprises the following constituents based on oxide by weight percentage (wt %): 2.0-5.0 wt % of TiO$_2$, 0.25-2.5 wt % of CeO$_2$, 0.25-3.0 wt % of Y$_2$O$_3$, 65.0-75.0 wt % of SiO$_2$, 6.0-12.0 wt % of B$_2$O$_3$ (boron trioxide), 3.5-6.5 wt % of Al$_2$O$_3$ (aluminum oxide); and the total amount of Na$_2$O (sodium oxide), K$_2$O (potassium oxide) and Li$_2$O (lithium oxide) is 5.5-9.5 wt %; and the total amount of CaO (calcium oxide), MgO (magnesium oxide) and BaO (barium oxide) is 1.0-5.5 wt %; wherein it is free of an iron compound such as ferric oxide. The glass provided can have relatively good UV resistance, and/or alkali resistance, and/or good light transmittance.

In some embodiments, the borosilicate glass provided by the present invention comprises the following constituents based on oxide by weight percentage (wt %): 2.0-5.0 wt % of $TiO_2$, 0.25-2.5 wt % of $CeO_2$, 0.25-3.0 wt % of $Y_2O_3$, 65.0-75.0 wt % of $SiO_2$, 6.0-12.0 wt % of $B_2O_3$, 3.5-6.5 wt % of $Al_2O_3$; the total amount of $SiO_2$, $TiO_2$ and $CeO_2$ is not less than 72.0 wt %; the total amount of $Na_2O$, $K_2O$ and $Li_2O$ is 5.5-9.5 wt %; the total amount of CaO, MgO and BaO is 1.0-5.5 wt %; wherein it is free of an iron compound such as ferric oxide. The glass provided can have relatively good UV resistance, and/or alkali resistance, and/or good light transmittance.

In some embodiments, the borosilicate glass provided by the present invention comprises the following constituents based on oxide by weight percentage (wt %): 2.0-5.0 wt % of $TiO_2$, 0.5-1.5 wt % of $CeO_2$ and 0.25-3.0 wt % of $Y_2O_3$; wherein it is free of an iron compound such as ferric oxide. The glass provided can have relatively good UV resistance and/or alkali resistance, and/or good light transmittance.

In some embodiments, according to examples of the present invention, the borosilicate glass provided by the present invention comprises the following constituents based on oxide by weight percentage (wt %): 2.0-5.0 wt % of $TiO_2$, 0.5-1.5 wt % of $CeO_2$ and 0.25-3.0 wt % of $Y_2O_3$; and the total amount of $SiO_2$, $TiO_2$ and $CeO_2$ is not less than 72.0 wt %; wherein it is free of an iron compound such as ferric oxide. The borosilicate glass provided can have good UV resistance and good alkali resistance. At light wavelengths not exceeding 380 nm, the transmittance T is less than 10%.

In some embodiments, the borosilicate glass provided by the present invention comprises the following constituents based on oxide by weight percentage (wt %): 2.0-5.0 wt % of $TiO_2$, 0.5-1.5 wt % of $CeO_2$, 0.25-3.0 wt % of $Y_2O_3$, 65.0-75.0 wt % of $SiO_2$, 6.0-12.0 wt % of $B_2O_3$, 3.5-6.5 wt % of $Al_2O_3$; and the total amount of $Na_2O$, $K_2O$ and $Li_2O$ is 5.5-9.5 wt %; and the total amount of CaO, MgO and BaO is 1.0-5.5 wt %; wherein it is free of an iron compound such as ferric oxide. The glass provided can have relatively good UV resistance, and/or alkali resistance, and/or good light transmittance.

In some embodiments, the borosilicate glass provided by the present invention comprises the following constituents based on oxide by weight percentage (wt %): 2.0-5.0 wt % of $TiO_2$, 0.5-1.5 wt % of $CeO_2$, 0.25-3.0 wt % of $Y_2O_3$, 65.0-75.0 wt % of $SiO_2$, 6.0-12.0 wt % of $B_2O_3$, 3.5-6.5 wt % of $Al_2O_3$; and the total amount of $SiO_2$, $TiO_2$ and $CeO_2$ is not less than 72.0 wt %; and the total amount of $Na_2O$, $K_2O$ and $Li_2O$ is 5.5-9.5 wt %; the total amount of CaO, MgO and BaO is 1.0-5.5 wt %; wherein it is free of an iron compound such as ferric oxide. The glass provided can have relatively good UV resistance, and/or alkali resistance, and/or good light transmittance.

According to examples of the present invention, in some embodiments, the borosilicate glass provided by the present invention comprises or has the following constituents based on oxide by weight percentage (wt %):

| | |
|---|---|
| $SiO_2$ | 65.0-75.0 wt %, |
| $B_2O_3$ | 6.0-12.0 wt %, |
| $Al_2O_3$ | 3.5-6.5 wt %, |
| $Na_2O$ | 4.5-8.5 wt %, |
| $K_2O$ | 0-2.5 wt %, |
| $Li_2O$ | 0-1.0 wt %, |
| wherein $\Sigma(Na_2O + K_2O + Li_2O)$ | 5.5-9.5 wt %, |
| CaO | 0.5-3.5 wt %, |
| MgO | 0-1.0 wt %, |
| BaO | 0-2.0 wt %, |
| wherein $\Sigma(CaO + MgO + BaO)$ | 1.0-5.5 wt %, |
| $TiO_2$ | 2.0-5.0 wt %, |
| $CeO_2$ | 0.25-2.5 wt %, |
| NaCl | 0-1.0 wt %, |
| $Y_2O_3$ | 0.25-3.0 wt %, |
| $ZrO_2$ | 0-4.0 wt %, |
| ZnO | 0-2.0 wt %, and |
| $La_2O_3$ | 0-2.0 wt %. |

According to examples of the present invention, in some embodiments, the borosilicate glass provided by the present invention comprises or has the following constituents based on oxide by weight percentage (wt %):

| | |
|---|---|
| $SiO_2$ | 65.0-75.0 wt %, |
| $B_2O_3$ | 6.0-12.0 wt %, |
| $Al_2O_3$ | 3.5-6.5 wt %, |
| $Na_2O$ | 4.5-8.5 wt %, |
| $K_2O$ | 0-2.5 wt %, |
| $Li_2O$ | 0-1.0 wt %, |
| wherein $\Sigma(Na_2O + K_2O + Li_2O)$ | 5.5-9.5 wt %, |
| CaO | 0.5-3.5 wt %, |
| MgO | 0-1.0 wt %, |
| BaO | 0-2.0 wt %, |
| wherein $\Sigma(CaO + MgO + BaO)$ | 1.0-5.5 wt %, |
| $TiO_2$ | 2.0-5.0 wt %, |
| $CeO_2$ | 0.25-2.5 wt %, |
| NaCl | 0-1.0 wt %, |
| $Y_2O_3$ | 0.25-3.0 wt %, |
| $ZrO_2$ | 0-4.0 wt %, |
| ZnO | 0-2.0 wt %, and |
| $La_2O_3$ | 0-2.0 wt %, wherein $\Sigma(SiO_2 + TiO_2 + CeO_2) \geq 72.0$ wt %. |

According to examples of the present invention, in the glass of the present invention, the appropriate amount of $TiO_2$ and $CeO_2$ can reduce the ultraviolet transmittance of the glass sharply, and can reach the transmittance T % being less than 10% when the wavelength is $\leq 380$ nm. While adding an appropriate amount of yttrium oxide to the glass that satisfies the ultraviolet transmittance can greatly improve the alkali resistance of the glass, achieve class 1 alkali resistance of the glass, and meet the HGB class 1 water resistance and class 1 acid resistance of the glass. It can give a suitable coefficient of linear thermal expansion, and at the same time it is beneficial to the production of the glass. While without adding ferric oxide, it is beneficial to improving the alkali resistance. In some embodiments, in the borosilicate glass provided by the present invention, adding appropriate amounts of yttrium oxide, zirconia, lanthanum oxide, and/or zinc oxide can greatly improve the alkali resistance of the glass, achieve class 1 alkali resistance of the glass, meet the HGB class 1 water resistance and class 1 acid resistance of the glass, and make the glass have a suitable coefficient of linear thermal expansion. At the same time, it is beneficial to the production of the glass.

According to examples of the present invention, the amount of $SiO_2$ in the glass of the present invention is 65.0-75.0 wt %, preferably 68.5-72.5 wt %. The amount of $SiO_2$ is in this range can ensure the glass performance under the premise of forming the basic framework of glass. A higher content will increase the viscosity of the glass and the melting temperature. If the amount of $SiO_2$ is further reduced, the acid resistance of the glass will be worse.

According to examples of the present invention, the amount of $B_2O_3$ in the glass of the present invention is 6.0-12.0 wt %, preferably 8.0-10.0 wt %. The proper introduction of $B_2O_3$ plays a vital role in reducing the coefficient of linear thermal expansion, processing temperature and melting temperature, and improving chemical stability.

In one aspect, $B_2O_3$ binds the alkali metal ions in the glass more firmly to the glass structure. When the water resistance of the glass is measured, the alkali metal ions released are reduced, and the decrease in the amount of $B_2O_3$ will significantly reduce the water resistance. In other aspect, through a large number of experimental studies, the inventors of the present invention found that as the amount of $B_2O_3$ increases, the viscosity of the glass gradually decreases, and the coefficient of linear thermal expansion gradually decreases. However, when the amount of $B_2O_3$ is more than 12.0 wt %, phase separation may occur in the glass, resulting in uneven stress in the glass and easy cracking of glass. As the amount of $B_2O_3$ further increases, boron volatilization becomes more severe. This will not only intensify the erosion of refractory materials, cause waste of energy, but also cause fluctuations in chemical composition of the glass. In addition, higher amount of $B_2O_3$ can also adversely affect the acid resistance of the glass. Therefore, the amount of $B_2O_3$ should not be too low or too high, and it is preferably within the above range.

According to examples of the present invention, the amount of $Al_2O_3$ in the glass of the present invention is 3.5-6.5 wt %, preferably 4.1-5.9 wt %. Like $B_2O_3$, $Al_2O_3$ firmly fixes alkali metal oxides, especially $Na_2O$, in the glass structure. Therefore, an amount too high will lead to an increase in melting temperature and processing temperature. In addition, $Al_2O_3$ has a positive effect on anti-crystallization. Decreasing the amount of $Al_2O_3$ may increase the crystallization tendency accordingly.

According to examples of the present invention, for the glass of the present invention, it is very important to control the amount of metal oxides within a limited range. The total amount of alkali metal oxides $Na_2O$, $K_2O$ and $Li_2O$ is 5.5-9.5 wt %, preferably 6.0-8.0 wt %.

According to examples of the present invention, it is very important to control the amount of each alkali metal oxide in the glass of the present invention within a limited range. The performance of the glass can be improved correspondingly by optimizing the amount of each alkali metal oxide. Therefore, the glass according to the present invention comprises 4.5-8.5 wt % of $Na_2O$, preferably at least 5.5-7.0 wt % of $Na_2O$; 0-2.5 wt % of $K_2O$, preferably 0-1.0 wt % of $K_2O$; 0-1.0 wt % of $Li_2O$, preferably 0-0.5 wt % of $Li_2O$, and the total amount of alkali metal oxides is 5.5-9.5 wt %, preferably 6.0-8.0 wt %.

The above-mentioned alkali metal oxides adjust the glass properties within their respective upper limits. For example, the combination of the three alkali metal oxides plays an important role in adjusting the coefficient of linear thermal expansion of the glass. $Na_2O$ and $Li_2O$ reduce the melting temperature and processing temperature of the glass, and $K_2O$ and/or $Li_2O$ play a beneficial role in reducing glass crystallization. It is important to maintain a balanced ratio between them. When the respective upper limits are exceeded, the glass has an excessively high coefficient of linear thermal expansion, which is not conducive to cost reduction, while an excessively low amount of alkali metal oxides causes the coefficient of linear thermal expansion to be too low. Therefore, when the amount of the alkali metal oxides is limited to the above range, a borosilicate glass having a coefficient of linear thermal expansion and a processing temperature satisfying the requirements can be obtained.

According to examples of the present invention, the glass of the present invention further includes alkaline earth metal oxides in an amount of 1.0-5.5 wt %, preferably 1.5-3.0 wt %. Specifically, the amount of CaO (calcium oxide) is 0.5-3.5 wt %, preferably 1.0-1.8 wt %; the amount of MgO (magnesium oxide) is 0-1.0 wt %, preferably 0-0.8 wt %; the amount of BaO (barium oxide) is 0-2.0 wt %, preferably 0.4-1.0 wt %. The above-mentioned alkaline earth metal oxides change the "material length of glass", i.e., the processing temperature range of the glass; in addition, the alkaline earth metal oxides reduce the high-temperature viscosity of the glass, improve chemical stability, reduce the tendency of crystallization, and make the viscosity characteristics and other properties of the glass match the specific production and processing processes through different network modification effects. In addition, CaO improves acid resistance, but if the amount of CaO is too much, the amount of $SiO_2$ and $B_2O_3$ will be reduced, which will loosen the network structure of the glass and is not conducive to the improvement of the alkali resistance of the glass. BaO reduces the processing temperature without adversely affecting water resistance. If the amount of alkaline earth metals is too high, the coefficient of linear thermal expansion will increase, while if the amount is too low, the performance of glass will be unduly damaged. Preferably, the total amount of the alkaline earth metal oxides is at most 3.0 wt %.

According to examples of the present invention, the glass of the present invention further contains 0-1.0 wt % NaCl (sodium chloride), preferably 0.05-1.0 wt % NaCl. Sodium chloride is mainly used as a clarifying agent to clarify the glass. Those skilled in the art can also use other standard clarifying agents, such as $CaF_2$ (calcium fluoride) and/or sulfates such as $Na_2SO_4$ (sodium sulfate) and/or nitrates such as $NaNO_3$ (sodium nitrate). The above-mentioned clarifying agent adopts a standard amount, i.e., according to the type and amount of the clarifying agent in the finished glass, 0.003-1.0 wt % of the standard clarifying agent is used for clarification. Because $As_2O_3$ (arsenic trioxide) and $Sb_2O_3$ (antimony trioxide) are not used, the glass is free of $As_2O_3$ and $Sb_2O_3$ apart from inevitable impurities, which is particularly advantageous for the glass as a primary packaging material for a pharmaceutical.

The inventors found that as the amount of $CeO_2$ gradually increases, the UV resistance of the glass improves, but when the amount is more than 3.0 wt %, the alkali resistance significantly reduces. Within a certain amount of range, when more $TiO_2$ is added, both the glass's UV resistance and alkali resistance can improve, but when it exceeds a certain amount, the UV resistance can improve, while the alkali resistance reduces. According to examples of the present invention, the glass provided by the present invention may contain 2.0-5.0 wt % of $TiO_2$, which is beneficial to improving the ultraviolet resistance performance of the glass and take into account other properties at the same time. According to examples of the present invention, in some embodiments, the glass provided by the present invention may contain 0.25-2.5 wt % of $CeO_2$, which is beneficial to improving the ultraviolet resistance performance of the glass and take into account other properties at the same time. According to examples of the present invention, in some embodiments, the glass provided by the present invention preferably contains 0.5-1.5 wt % of $CeO_2$, which is beneficial to improving the ultraviolet resistance and alkali resistance of the glass and take into account transmittance at the same time.

According to examples of the present invention, the glass of the present invention contains 2.0-5.0 wt % of $TiO_2$ and 0.25-2.5 wt % of $CeO_2$, which is beneficial to improving the ultraviolet resistance performance of the glass and take into account other properties at the same time. Therefore, using this glass containing $TiO_2$ and $CeO_2$ as a medical packaging material, even when it is placed in a radioactive environment, the presence of any particulate matter can be checked by the naked eye, and at the same time, the glass can be prevented from discoloring due to radioactive radiation. When the concentration of $TiO_2$ and $CeO_2$ is too high, the inherent brownish yellow that does not meet the requirements will be produced. Furthermore, if the amount is too high, the production cost of the glass will be greatly increased. Therefore, in the present invention, the amount of $TiO_2$ is preferably 2.0-3.5 wt %, and the amount of $CeO_2$ is preferably 0.5-1.5 wt %. In some embodiments, the amount of $TiO_2$ is preferably 2.0-3.0 wt %, the amount of $CeO_2$ is preferably 0.5-1.2 wt %.

The inventors have found through a large number of experiments that when only ZnO and/or $La_2O_3$ is used and the addition reaches 5.0 wt %, the glass still cannot achieve the class 1 alkali resistance, while the addition of $Y_2O_3$ can greatly improve the alkali resistance of the glass. According to examples of the present invention, the glass of the present invention contains 0.25-3.0 wt % of $Y_2O_3$, and preferably contains 0.5-2.0 wt % of $Y_2O_3$. When the amount of $Y_2O_3$ increases to a certain amount, it mainly provides non-bridge oxygen, which acts as a network disconnection, destroys the glass network structure, makes the structure loose, and sharply increases the coefficient of linear thermal expansion of the glass. When the amount of $Y_2O_3$ is in the above range, not only the water resistance and acid resistance of the obtained glass belong to the class 1, but also the alkali resistance belongs to the class 1, which is particularly important to ensure the alkali resistance of the glass in the production process. According to examples of the present invention, the glass of the present invention preferably contains 0.5 wt % of $Y_2O_3$, so that the glass has better alkali resistance and it is beneficial to controlling the production process and production cost.

According to examples of the present invention, the glass of the present invention may not contain $ZrO_2$, ZnO or/and $La_2O_3$. According to examples of the present invention, the glass of the present invention may further contain at least one of $ZrO_2$, ZnO and $La_2O_3$. Through research the inventors have found that if the amount of $ZrO_2$ is too high, the forming temperature and melting temperature of the glass are likely to increase, resulting in a significant increase in production cost. According to examples of the present invention, the glass of the present invention may further contain at least one of 0-4.0 wt % $ZrO_2$, 0-2.0 wt % ZnO and 0-2.0 wt % $La_2O_3$. According to the embodiments of the present invention, the glass of the present invention may further contain any one of a preferred amount of 0-2.0 wt % of $ZrO_2$, a preferred amount of 0-1.0 wt % of ZnO, and a preferred amount of 0-1.0 wt % of $La_2O_3$; according to another embodiment of the present invention, the glass of the present invention may also include an optional combination of the two of $ZrO_2$, ZnO, and $La_2O_3$. When the glass contains multiple oxides of $ZrO_2$, ZnO and $La_2O_3$, the amount of each oxide is not affected by each other. The glass formed by the combination of $Y_2O_3$ and the above-mentioned oxide not only does not destroy other production performance parameters, but also has good UV resistance, and its water resistance, acid resistance and alkali resistance reach class 1 at the same time. In addition, $ZrO_2$, ZnO, or $La_2O_3$ is cheaper and easier to obtain than $Y_2O_3$, which can further reduce production cost. According to the embodiments of the present invention, the glass of the present invention preferably contains at least one of 0-1.0 wt % of lanthanum oxide, zirconia and zinc oxide. According to an embodiment of the present invention, the glass of the present invention preferably contains 1.0 wt % of zirconia, so that the glass has better alkali resistance, and at the same time, it is beneficial to controlling the production process and production cost.

According to examples of the present invention, in some embodiments, in order to make the obtained glass have class 1 acid resistance, class 1 water resistance, class 1 alkali resistance, better UV resistance, and the performance of the transmittance T % being less than 10% at a wavelength of 380 nm, the glass provided by the present invention comprises the following constituents based on oxide by weight percentage (wt %): 2.0-5.0 wt % of $TiO_2$, 0.5-1.5 wt % of $CeO_2$, 0.25-3.0 wt % of $Y_2O_3$, and $\Sigma(SiO_2+TiO_2+CeO_2)$ ≥72.0 wt %.

In some embodiments, the borosilicate glass provided by the present invention comprises the following constituents based on oxide by weight percentage (wt %), so that the glass has good UV resistance and good alkali resistance, and it is easy to produce and control:

| | |
|---|---|
| $SiO_2$ | 68.5-72.0 wt %, |
| $B_2O_3$ | 8.0-10.0 wt %, |
| $Al_2O_3$ | 4.6-5.9 wt %, |
| $Na_2O$ | 5.5-7.0 wt %, |
| $K_2O$ | 0-1.0 wt %, |
| $Li_2O$ | 0-0.5 wt %, |
| wherein $\Sigma(Na_2O + K_2O + Li_2O)$ | 6.0-8.0 wt %, |
| CaO | 1.0-1.8 wt %, |
| MgO | 0-0.8 wt %, |
| BaO | 0.4-1.0 wt %, |
| wherein $\Sigma(CaO + MgO + BaO)$ | 1.5-3.0 wt %, |
| $TiO_2$ | 2.0-3.0 wt %, |
| $CeO_2$ | 0.5-1.5 wt %, |
| NaCl | 0-0.5 wt %, |
| $Y_2O_3$ | 0.5-2.0 wt %, |
| $ZrO_2$ | 0-2.0 wt %, |
| ZnO | 0-1.0 wt %, and |
| $La_2O_3$ | 0-1.0 wt %. |

In some embodiments, the borosilicate glass provided by the present invention comprises the following constituents based on oxide by weight percentage (wt %), so that the glass has good UV resistance and good alkali resistance, and it is easy to produce and control:

| | |
|---|---|
| $SiO_2$ | 68.5-72.0 wt %, |
| $B_2O_3$ | 8.0-10.0 wt %, |
| $Al_2O_3$ | 4.6-5.9 wt %, |
| $Na_2O$ | 5.5-7.0 wt %, |
| $K_2O$ | 0-1.0 wt %, |
| $Li_2O$ | 0-0.5 wt %, |
| wherein $\Sigma(Na_2O + K_2O + Li_2O)$ | 6.0-8.0 wt %, |
| CaO | 1.0-1.8 wt %, |
| MgO | 0-0.8 wt %, |
| BaO | 0.4-1.0 wt %, |
| wherein $\Sigma(CaO + MgO + BaO)$ | 1.5-3.0 wt %, |
| $TiO_2$ | 2.0-3.0 wt %, |
| $CeO_2$ | 0.5-1.2 wt %, |
| NaCl | 0-0.5 wt %, |
| $Y_2O_3$ | 0.5-2.0 wt %, |
| $ZrO_2$ | 0-2.0 wt %, |
| ZnO | 0-1.0 wt %, and |
| $La_2O_3$ | 0-1.0 wt %. |

According to examples of the present invention, the coefficient of linear thermal expansion $\alpha_{20/300}$ of the glass of the present invention is $4.4 \times 10^{-6}$/K to $5.8 \times 10^{-6}$/K, which is similar to the thermal expansion characteristics of molybdenum and KOVAR alloys, so it can be smoothly fused with molybdenum and KOVAR alloys such as Fe—Co—Ni alloys to serve as a sealing glass for such metals. In addition, the glass has very good UV resistance, good chemical stability, HGB class 1 water resistance, class 1 acid resistance and class 1 alkali resistance. Because of its excellent UV resistance, alkali resistance and low coefficient of linear thermal expansion, it is particularly suitable to use as packaging materials for pharmaceuticals, as well as equipment and glass instruments in the chemical industry production and laboratory fields.

According to examples of the present invention, the suitable melting range and working range of the glass of the present invention reduce the energy consumption in the production process.

In another aspect of the present invention, the glass provided by the invention is particularly suitable for using as a pharmaceutical packaging material.

In another aspect of the present invention, the glass provided by the invention is particularly suitable for using as a container and/or a chemical device for chemically corrosive liquid.

In another aspect of the present invention, the glass provided by the present invention is particularly suitable for using as a glass-metal sealing glass, such as sealing metal molybdenum, KOVAR, and the like.

In the present invention, "free of an iron compound" refers to that no additional iron compound is added or used, such as $Fe_2O_3$, when its amount does not exceed 100 ppm (parts per million), its presence is considered to be non-containing, and when it exceeds 100 ppm, it is considered to contain an iron compound. "Inevitable impurities" means that the impurities do not exceed 1 ppm, for example, when arsenic compounds such as $As_2O_3$ do not exceed 0.1 ppm, they are considered inevitable impurities, and when antimony compounds such as $Sb_2O_3$ do not exceed 1 ppm, they are considered inevitable impurities.

EXAMPLES

Embodiments of the present invention are described in detail below, and examples of the embodiments are shown in tables. The embodiments described below with reference to the tables are exemplary and are intended to explain the present invention and should not be construed as limiting the present invention.

Unless defined otherwise, all technical and scientific terms used herein have the same meaning as is commonly understood by one skilled in the art to which this invention belongs. All patents and publications referred to herein are incorporated by reference in their entirety. The term "comprise", "include" or "contain" is an open expression, it means comprising the contents disclosed herein, but don't exclude other contents. In the present invention, regardless of whether or not the word "about" is used, all numbers disclosed herein are approximate values, and the value of each number may vary by less than 1%, such as 0.1%, 0.5% or a 1%, or a reasonable difference that one skilled in the art would consider.

If the specific technology or conditions are not indicated in the examples, the technology or conditions described in the literature in the art or the product descriptions are performed. If the reagents or instruments used are not specified by the manufacturers, they are all conventional products that are commercially available.

In the examples described below, unless otherwise indicated all temperatures are set forth in degrees Celsius. The reagents used are all commercially available or can be prepared by a method described in the present invention.

The following abbreviations are used throughout the present invention: wt % means weight percentage; mg means milligram; μg means microgram; mm means millimeter; nm means nanometer; $T_g$ means transition temperature; $T_f$ means expansion and softening temperature; $dm^2$ means square decimeter; ° C. means Celsius; T % means UV-visible light transmittance; dPa·s means decipascal·second; ppm means parts per million, and the symbol "Σ" means a summation of.

Test Methods for Various Performance Parameters:

Test method for water resistance (H): according to YBB00362004-2015, a certain amount of glass particles of specified size is taken, and put into a specified container, then a certain amount of water is added, and the mixture is heated under the specified conditions. By titrating the leaching solution, the volume of hydrochloric acid titration solution (0.01 mol/L) consumed by per gram of glass particles is used to measure the degree of glass particles eroded by water and classified. The maximum value of a high chemical resistant glass belonging to HGB class 1 water resistance is 0.10 mL. The maximum value of a HGB class 2 water-resistant glass is 0.20 mL. The maximum value of a HGB class 3 water-resistant glass is 0.85 mL.

Test method for alkali resistance (L): according to YBB00352004-2015, a glass test sample with a total surface area of 10 $cm^2$-15 $cm^2$ is etched with an equal volume of a boiling mixed solution of 0.5 mol/L sodium carbonate and 1.0 mol/L sodium hydroxide for 3 hours. The mass loss per unit surface area of the glass test sample is measured. Each example in tables gives weight loss in $mg/dm^2$. The maximum weight loss of a glass in class 1 alkali resistance is 75 $mg/dm^2$. The maximum weight loss of a glass in class 2 alkali resistance is 175 $mg/dm^2$. A glass with a maximum loss more than 175 $mg/dm^2$ is class 3 alkali resistance.

Test method for acid resistance (S): according to YBB00342004-2015, a glass test sample of about 100 $cm^2$ is etched in a boiling hydrochloric acid solution of 6±0.2 mol/L for 6 hours to determine the mass loss per unit area. Each example in tables gives weight loss in unit of $mg/dm^2$. The maximum weight loss of a glass in class 1 acid resistance is 0.7 $mg/dm^2$. The maximum weight loss of a glass in class 2 acid resistance is 1.5 $mg/dm^2$. A glass with a maximum loss more than 1.5 $mg/dm^2$ is class 3 acid resistance.

Test method for coefficient of linear thermal expansion (α): according to YBB00202003-2015, first a glass block is cut into a glass strip with length×width×height=25×6×6 (error ±0.1 mm) using a micro-controlled inner circle cutting machine (Northwest Machinery Co., Ltd. J5085-1/ZF), and then $\alpha_{(20;\ 300)}$ [$10^{-6}$/K], transition temperature $T_g$, and expansion softening temperature $T_f$ of the glass strip are measured with a thermal expansion meter (NETZSCH DIL 402 PC).

Test method for UV-visible light transmittance (T %): first a glass block is cut into glass pieces with a thickness of 1.5±0.1 mm using a micro-controlled inner circle cutting machine (Northwest Machinery Co., Ltd. J5085-1/ZF), and then both sides of the glass sheet are polished into a mirror surface using a precision grinding and polishing machine (Shenyang Kejing Automation Equipment Co., Ltd. UNI-POL-802), with the thickness of the glass sheet being 1±0.05 mm, and finally the transmittance is measured with an Agilent Cary 60 UV-visible spectrophotometer.

Processing temperature ($V_A$): Orton RSV-1600 rotary high temperature viscometer is used, and the tempered glass sample needs to be ≥600 g, and the corresponding viscosity is $10^{-4}$ dPa·S.

Tables 1 to 4 show the constituents (weight percent, wt %, based on oxide) of different glasses and important performance parameters of these glasses, including coefficient of linear thermal expansion α (20; 300) (unit: $10^{-6}$/K), transition temperature $T_g$ (unit: °C.), expansion softening temperature $T_f$ (unit: °C.), water resistance H (unit: mL), acid resistance S (unit: mg/dm²), alkali resistance L (unit: mg/dm²); processing temperature $V_A$ (unit: °C.); wherein Examples 1 to 3 are used as controls.

Table 5 shows the UV-visible light transmittance T (%) of glasses of different constituents (wt %, based on oxide).

Example 1

TABLE 1 composition of glass (weight percentage, wt %, based on oxide) and main properties, where n.d. means not determined

| Constituents | A1 | A2 | A3 | A4 | A5 | A6 | A7 | A8 |
|---|---|---|---|---|---|---|---|---|
| $SiO_2$ | 71.82 | 71.00 | 71.10 | 70.32 | 68.40 | 67.64 | 67.77 | 67.15 |
| $B_2O_3$ | 10.26 | 10.97 | 10.16 | 10.86 | 9.78 | 10.45 | 9.68 | 9.59 |
| $Al_2O_3$ | 5.69 | 5.62 | 5.63 | 5.57 | 5.42 | 5.36 | 5.37 | 5.32 |
| CaO | 2.68 | 1.33 | 2.65 | 1.31 | 2.55 | 1.26 | 2.53 | 2.51 |
| MgO | 0.64 | 0.32 | 0.64 | 0.31 | 0.61 | 0.30 | 0.61 | 0.60 |
| BaO | 0.61 | 1.81 | 0.60 | 1.79 | 0.58 | 1.73 | 0.58 | 0.57 |
| $Na_2O$ | 6.91 | 7.57 | 6.85 | 7.49 | 6.59 | 7.21 | 6.52 | 6.46 |
| $K_2O$ | 0.75 | 0.74 | 0.74 | 0.73 | 0.72 | 0.71 | 0.71 | 0.70 |
| $Li_2O$ | 0.24 | 0.24 | 0.24 | 0.23 | 0.23 | 0.22 | 0.22 | 0.22 |
| $TiO_2$ | — | — | — | — | 3.80 | 3.80 | 3.76 | 3.72 |
| $Fe_2O_3$ | — | — | — | — | 0.95 | 0.95 | 0.94 | 0.93 |
| $CeO_2$ | 0.10 | 0.10 | 0.10 | 0.10 | 0.09 | 0.09 | 0.09 | 0.09 |
| NaCl | 0.30 | 0.30 | 0.30 | 0.30 | 0.28 | 0.28 | 0.28 | 0.28 |
| $Y_2O_3$ | — | — | 0.99 | 0.99 | — | — | 0.94 | 1.86 |
| $ZrO_2$ | — | — | — | — | — | — | — | — |
| $La_2O_3$ | — | — | — | — | — | — | — | — |
| ZnO | — | — | — | — | — | — | — | — |
| Coefficient of linear thermal expansion | 5.46 | 5.58 | 5.39 | 6.04 | 5.04 | 5.17 | 4.66 | 4.73 |
| $T_g$ | 587.7 | 578.0 | 590.7 | 608.8 | 627.0 | 615.0 | 633.5 | 639.3 |
| $T_f$ | 652.8 | 636.7 | 668.5 | 683.9 | 696.4 | 684.8 | 711.5 | 713.6 |
| H | 0.02 | 0.02 | 0.02 | 0.02 | 0.03 | 0.03 | 0.03 | 0.03 |
| S | 0.51 | 0.57 | 0.46 | 0.52 | 0.41 | 0.49 | 0.43 | 0.53 |
| L | 96.02 | 106.39 | 70.20 | 73.77 | 155.98 | 188.70 | 114.48 | 138.31 |
| $V_A$ | n.d. | n.d. | n.d. | n.d. | n.d. | n.d. | n.d. | n.d. |

Example 2

TABLE 2 composition of glass (wt %, based on oxide) and main properties, where n.d. means not determined

| Constituents | A9 | A10 | A11 | A12 | A13 | A14 | A15 | A16 |
|---|---|---|---|---|---|---|---|---|
| $SiO_2$ | 68.47 | 67.21 | 67.84 | 67.84 | 67.21 | 66.56 | 69.44 | 70.45 |
| $B_2O_3$ | 9.79 | 9.60 | 9.69 | 9.69 | 9.60 | 9.51 | 9.73 | 8.69 |
| $Al_2O_3$ | 5.42 | 5.32 | 5.37 | 5.37 | 5.32 | 5.27 | 5.39 | 5.40 |
| CaO | 2.56 | 2.51 | 2.53 | 2.53 | 2.51 | 2.49 | 1.27 | 1.28 |
| MgO | 0.61 | 0.60 | 0.61 | 0.61 | 0.60 | 0.60 | 0.61 | 0.61 |
| BaO | 0.58 | 0.57 | 0.58 | 0.58 | 0.57 | 0.57 | 0.58 | 0.58 |
| $Na_2O$ | 6.59 | 6.47 | 6.53 | 6.53 | 6.47 | 6.41 | 6.56 | 6.57 |
| $K_2O$ | 0.72 | 0.70 | 0.71 | 0.71 | 0.70 | 0.70 | 0.71 | 0.71 |
| $Li_2O$ | 0.23 | 0.22 | 0.22 | 0.22 | 0.22 | 0.22 | 0.23 | 0.23 |
| $TiO_2$ | 3.80 | 3.73 | 2.82 | 2.82 | 2.80 | 2.77 | 2.84 | 2.84 |
| $Fe_2O_3$ | — | — | — | — | — | — | — | — |
| $CeO_2$ | 0.95 | 0.93 | 0.94 | 1.88 | 1.86 | 1.85 | 0.47 | 0.47 |
| NaCl | 0.28 | 0.28 | 0.28 | 0.28 | 0.28 | 0.28 | 0.28 | 0.28 |
| $Y_2O_3$ | — | 1.86 | 1.88 | 0.94 | 1.86 | — | 1.89 | 1.89 |
| $La_2O_3$ | — | — | — | — | — | — | — | — |

TABLE 2-continued composition of glass (wt %, based on oxide) and main properties, where n.d. means not determined

| Constituents | A9 | A10 | A11 | A12 | A13 | A14 | A15 | A16 |
|---|---|---|---|---|---|---|---|---|
| $ZrO_2$ | — | — | — | — | — | 2.77 | — | — |
| ZnO | — | — | — | — | — | — | — | — |
| Coefficient of linear thermal expansion | 5.24 | 5.35 | 5.52 | 5.39 | 5.65 | 4.94 | 5.22 | 5.54 |
| Tg | 594.2 | 603.3 | 609.5 | 606.5 | 592.9 | 624.7 | 611.0 | 695.6 |
| Tf | 671.0 | 676.0 | 687.3 | 689.6 | 690.4 | 698.0 | 693.9 | 670.2 |
| H | 0.02 | 0.03 | 0.02 | 0.02 | 0.03 | 0.03 | 0.02 | 0.03 |
| S | 0.43 | 0.47 | 0.45 | 0.37 | 0.48 | 0.52 | 0.45 | 0.53 |
| L | 120.08 | 102.72 | 101.90 | 112.00 | 117.82 | 109.31 | 60.08 | 60.75 |
| $V_A$ | n.d. | n.d. | n.d. | n.d. | n.d. | n.d. | n.d. | n.d. |

Example 3

TABLE 3 composition of glass (wt %, based on oxide) and main properties, where n.d. means not determined

| Constituents | A17 | A18 | A19 | A20 | A21 | A22 | A23 | A24 | A25 |
|---|---|---|---|---|---|---|---|---|---|
| $SiO_2$ | 69.75 | 70.42 | 70.42 | 69.46 | 70.13 | 70.13 | 69.47 | 69.47 | 68.84 |
| $B_2O_3$ | 9.96 | 10.06 | 10.06 | 8.57 | 8.65 | 8.65 | 8.57 | 8.57 | 8.49 |
| $Al_2O_3$ | 5.52 | 5.58 | 5.58 | 5.32 | 5.37 | 5.37 | 5.32 | 5.32 | 5.27 |
| CaO | 2.60 | 2.63 | 2.63 | 1.26 | 1.27 | 1.27 | 1.26 | 1.26 | 1.25 |
| MgO | 0.62 | 0.63 | 0.63 | 0.61 | 0.61 | 0.61 | 0.61 | 0.61 | 0.60 |
| BaO | 0.59 | 0.60 | 0.60 | 0.57 | 0.57 | 0.57 | 0.57 | 0.57 | 0.56 |
| $Na_2O$ | 6.71 | 6.78 | 6.78 | 6.48 | 6.54 | 6.54 | 6.48 | 6.48 | 6.42 |
| $K_2O$ | 0.73 | 0.73 | 0.73 | 0.70 | 0.71 | 0.71 | 0.70 | 0.70 | 0.69 |
| $Li_2O$ | 0.23 | 0.23 | 0.23 | 0.22 | 0.23 | 0.23 | 0.22 | 0.22 | 0.22 |
| $TiO_2$ | — | — | — | 2.80 | 2.82 | 2.82 | 2.80 | 2.80 | 2.77 |
| $Fe_2O_3$ | — | — | — | — | — | — | — | — | — |
| $CeO_2$ | 0.10 | 0.10 | 0.10 | 0.93 | 0.94 | 0.94 | 0.93 | 0.93 | 0.92 |
| NaCl | 0.29 | 0.29 | 0.29 | 0.28 | 0.28 | 0.28 | 0.28 | 0.28 | 0.28 |
| $Y_2O_3$ | — | — | — | — | — | — | — | — | — |
| $La_2O_3$ | — | — | 1.95 | — | — | 1.88 | — | 0.93 | 0.92 |
| $ZrO_2$ | 2.90 | — | — | 2.80 | — | — | 1.86 | 1.86 | 1.85 |
| ZnO | — | 1.95 | — | — | 1.88 | — | 0.93 | — | 0.92 |
| Coefficient of linear thermal expansion | 5.07 | 5.38 | 5.31 | 5.21 | 5.45 | 5.36 | 5.32 | 5.28 | 5.36 |
| Tg | 615.3 | 594.1 | 592.3 | 618.7 | 598.4 | 595.3 | 609.7 | 601.4 | 605.9 |
| Tf | 682.4 | 675.6 | 673.8 | 698.1 | 695.6 | 698.8 | 694.3 | 697.1 | 703.5 |
| H | 0.02 | 0.03 | 0.02 | 0.02 | 0.03 | 0.02 | 0.02 | 0.02 | 0.03 |
| S | 0.41 | 0.39 | 0.48 | 0.58 | 0.47 | 0.53 | 0.41 | 0.46 | 0.51 |
| L | 73.05 | 87.23 | 82.17 | 96.81 | 109.30 | 100.28 | 89.05 | 97.23 | 93.17 |
| $V_A$ | n.d. | n.d. | n.d. | n.d. | n.d. | n.d. | n.d. | n.d. | n.d. |

Example 4

TABLE 4 composition of glass (based on oxide, wt %) and main properties, where n.d. means not determined

| Constituents | A26 | A27 | A28 | A29 | A30 | A31 | A32 | A33 | A34 |
|---|---|---|---|---|---|---|---|---|---|
| $SiO_2$ | 70.13 | 70.13 | 70.69 | 71.82 | 71.47 | 69.47 | 68.66 | 69.85 | 69.37 |
| $B_2O_3$ | 8.65 | 8.65 | 9.74 | 7.68 | 9.53 | 9.72 | 9.67 | 9.18 | 9.68 |
| $Al_2O_3$ | 5.37 | 5.37 | 5.40 | 5.43 | 4.65 | 5.01 | 5.74 | 5.00 | 5.36 |

TABLE 4-continued composition of glass (based on oxide, wt %) and main properties, where n.d. means not determined

| Constituents | A26 | A27 | A28 | A29 | A30 | A31 | A32 | A33 | A34 |
|---|---|---|---|---|---|---|---|---|---|
| CaO | 1.27 | 1.27 | 1.27 | 1.28 | 1.28 | 1.69 | 1.69 | 1.69 | 1.69 |
| MgO | 0.61 | 0.61 | 0 | 0.62 | 0.52 | 0.30 | 0.30 | 0.30 | 0 |
| BaO | 0.57 | 0.57 | 0.58 | 0.58 | 0.93 | 0.81 | 0.80 | 0.81 | 0.46 |
| $Na_2O$ | 6.54 | 6.54 | 6.56 | 6.61 | 5.65 | 6.78 | 6.75 | 6.78 | 6.76 |
| $K_2O$ | 0.71 | 0.71 | 0.71 | 0.72 | 0.71 | 0.42 | 0.42 | 0.42 | 0.71 |
| $Li_2O$ | 0.23 | 0.23 | 0.23 | 0.23 | 0.23 | 0.23 | 0.23 | 0.23 | 0.23 |
| $TiO_2$ | 2.82 | 2.82 | 2.28 | 2.28 | 2.28 | 2.83 | 2.83 | 2.83 | 2.83 |
| $Fe_2O_3$ | — | — | — | — | — | — | — | — | — |
| $CeO_2$ | 0.94 | 0.94 | 0.76 | 0.76 | 0.76 | 0.76 | 0.75 | 0.75 | 0.75 |
| NaCl | 0.28 | 0.28 | 0.28 | 0.28 | 0.28 | 0.28 | 0.28 | 0.28 | 0.28 |
| $Y_2O_3$ | 1.88 | 0.94 | 0.50 | 0.76 | 0.76 | 0.76 | 0.94 | 0.94 | 0.94 |
| $La_2O_3$ | — | — | — | — | — | 0.94 | — | — | — |
| $ZrO_2$ | — | — | 1.00 | 0.95 | 0.95 | — | 0.94 | — | 0.94 |
| ZnO | — | 0.94 | — | — | — | — | — | 0.94 | — |
| Coefficient of linear thermal expansion | 5.28 | 5.29 | 5.11 | 4.98 | 5.28 | 5.17 | 5.24 | 5.19 | 5.06 |
| Tg | 594.2 | 595.1 | 586.1 | 587.5 | 594.2 | 593.2 | 591.4 | 597.5 | 586.8 |
| Tf | 669.0 | 672.7 | 652.9 | 653.7 | 669.0 | 659.8 | 663.4 | 669.5 | 655.1 |
| H | 0.02 | 0.02 | 0.02 | 0.02 | 0.03 | 0.02 | 0.03 | 0.02 | 0.02 |
| S | 0.51 | 0.47 | 0.53 | 0.49 | 0.57 | 0.52 | 0.43 | 0.51 | 0.46 |
| L | 73.47 | 67.73 | 62.18 | 57.36 | 55.83 | 60.41 | 54.13 | 56.51 | 53.71 |
| $V_A$ | n.d. | n.d. | n.d. | 1237 | n.d. | n.d. | 1241 | n.d. | 1229 |

Example 5

The glass obtained in each composition of Examples 1-4 was tested for ultraviolet-visible light transmittance, and the results are shown in Table 5.

TABLE 5

UV-Visible light transmittance T (%) of glasses of different compositions (wt %, based on oxide).

| | Wavelength range, transmittance T (%) | | | | |
|---|---|---|---|---|---|
| Number | 290 nm | 320 nm | 380 nm | 450 nm | Remark |
| A1 | 8.30 | 25.15 | 86.42 | 89.08 | glass sheet thickness: 1 ± 0.05 mm |
| A2 | 8.88 | 26.13 | 87.96 | 90.24 | |
| A3 | 8.51 | 26.54 | 85.91 | 88.70 | |
| A4 | n.d. | n.d. | n.d. | n.d. | |
| A5 | 0.04 | 0.05 | 8.81 | 42.72 | |
| A6 | 0.05 | 0.06 | 3.43 | 29.78 | |
| A7 | 0.08 | 0.10 | 9.19 | 42.02 | |
| A8 | n.d. | n.d. | n.d. | n.d. | |
| A9 | 0.08 | 0.26 | 1.77 | 39.01 | |
| A10 | 0.12 | 0.13 | 2.24 | 50.45 | |
| A11 | 0.07 | 0.06 | 7.15 | 66.79 | |
| A12 | 0.15 | 0.26 | 0.36 | 29.67 | |
| A13 | 0.16 | 0.18 | 0.37 | 28.76 | |
| A14 | 0.21 | 0.11 | 0.67 | 25.52 | |
| A15 | 0.03 | 0.05 | 10.89 | 56.81 | |
| A16 | 0.12 | 0.04 | 21.57 | 66.63 | |
| A17 | 9.68 | 27.71 | 87.08 | 90.67 | |
| A18 | 8.58 | 25.43 | 86.70 | 90.04 | |
| A19 | 9.03 | 26.28 | 88.11 | 91.22 | |
| A20 | 0.05 | 0.25 | 1.93 | 51.56 | |
| A21 | 0.03 | 0.12 | 1.84 | 51.52 | |
| A22 | 0.12 | 0.32 | 5.35 | 62.56 | |
| A23 | 0.08 | 0.21 | 6.33 | 63.39 | |
| A24 | 0.02 | 0.14 | 4.12 | 57.10 | |
| A25 | 0.26 | 0.14 | 4.55 | 56.57 | |
| A26 | 0.10 | 0.03 | 5.19 | 58.58 | |
| A27 | 0.05 | 0.14 | 4.24 | 57.85 | |
| A28 | 0.02 | 0.09 | 6.29 | 60.76 | |
| A29 | 0.04 | 0.04 | 5.83 | 59.02 | |

TABLE 5-continued

UV-Visible light transmittance T (%) of glasses of different compositions (wt %, based on oxide).

| | Wavelength range, transmittance T (%) | | | | |
|---|---|---|---|---|---|
| Number | 290 nm | 320 nm | 380 nm | 450 nm | Remark |
| A30 | 0.08 | 0.06 | 5.85 | 59.45 | |
| A31 | 0.01 | 0.01 | 3.91 | 59.76 | |
| A32 | 0.05 | 0.13 | 6.78 | 61.84 | |
| A33 | 0.01 | 0.03 | 5.51 | 63.08 | |
| A34 | 0.01 | 0.02 | 5.10 | 60.84 | |

According to the performance parameter test results of the glass of control groups A1 to A25, by simply or conventionally adding or not adding yttrium oxide, the control groups A1 to A25 cannot achieve alkali resistance class 1 with the performance of the transmittance T % less than 10% at a wavelength ≤380 nm, and cannot meet the requirements of good water resistance, acid resistance, both alkali resistance and ultraviolet resistance; while the glass provided by the present invention (optimized compositions A26 to A34, Example 4) can achieve water resistance class 1, acid resistance class 1, and alkali resistance class 1, and at a wavelength ≤380 nm, the transmittance T % is less than 10%, i.e., good UV resistance performance, which meets the requirements of both alkali resistance and UV resistance, and also has good water resistance and acid resistance.

The glass of the present invention has high chemical stability. Specifically, when measuring water resistance at 98° C. according to YBB00362004-2015, the volume of hydrochloric acid titration solution (0.01 mol/L) consumed by per gram of glass particles was used to measure the degree of glass particles eroded by water and classified. The water resistance value of the glass of the optimized compositions A26 to A34 is at most 0.03 mL, which indicates that the glass of the present invention shows very excellent performance in water resistance and belongs to water resistance class 1.

When measuring acid resistance according to YBB00342004-2015, the mass loss per unit surface area of the glass test samples of the optimized compositions A26 to A34 are all less than 0.70 mg/dm$^2$, indicating that the acid resistance of the glass of the present invention also belongs to class 1.

When measuring alkali resistance according to YBB00352004-2015, the mass loss per unit surface area of the glass test samples of the optimized compositions A26 to A34 are all less than 75 mg/dm$^2$, indicating that the glass of the present invention is very excellent in alkali resistance and belongs to alkali resistance class 1.

According to the test results of the UV-visible light transmittance of each group, it can be known that the UV-visible light transmittance T % of the glass test sample of the optimized compositions A26 to A34 is less than 10%.

Therefore, the glass provided by the present invention belongs to class 1 in each of the three types of chemical resistance, and at the same time has good UV resistance. The glass of the present invention has both high chemical resistance and good UV resistance, and is very suitable for use in pharmaceutical packaging materials, equipment in chemical industry production and laboratory research fields, and containers for chemically aggressive liquids.

The viscosity of the glass in the cooling zone is characterized by the glass transition temperature $T_g$, which corresponds to a viscosity of approximately $10^{13.4}$ dPa·s. The proper transition temperature of the glass of the present invention is beneficial to reducing the energy consumption in the production process and is beneficial to the production of the glass. The glass provided by the present invention has a processing temperature ($V_A$) of less than 1400° C., or the glass provided by the present invention has a processing temperature ($V_A$) of less than 1300° C., which is beneficial to glass production.

The coefficient of linear thermal expansion $\alpha_{20/300}$ of the glass of the present invention is $4.4 \times 10^{-6}$/K to $5.8 \times 10^{-6}$/K, which is similar to the linear thermal expansion characteristics of molybdenum and KOVAR alloys, so it can be melted in molybdenum and KOVAR alloys as the sealing glass of such metals. Due to their own chemical resistance, it is also particularly suitable for the application of molten glass/metal seals used in chemically corrosive environments. Those skilled in the art can change the coefficient of linear thermal expansion by changing the amount of alkali metal oxides.

The methods of the present invention have been described by the preferred embodiments, and related person can clearly realize and apply the techniques disclosed herein by making some changes, appropriate alterations or combinations to the methods without departing from spirit, principles and scope of the present disclosure. Skilled in the art can learn from this article to properly improve the process parameters to implement the preparation method. Of particular note is that all similar substitutions and modifications to the skilled person are obvious, and they are deemed to be included in the present invention.

What is claimed is:

1. A borosilicate glass comprising the following constituents based on oxide: 2.0-5.0 wt % of $TiO_2$, 0.25-2.5 wt % of $CeO_2$, 0.25-3.0 wt % of $Y_2O_3$, wherein the borosilicate glass is free of an iron compound, and wherein the borosilicate glass is free of $As_2O_3$ and $Sb_2O_3$ apart from inevitable impurities.

2. The borosilicate glass of claim 1, wherein the total amount of $SiO_2$, $TiO_2$, and $CeO_2$ is not less than 72.0 wt %.

3. The borosilicate glass of claim 1, further comprising the following constituents: 65.0-75.0 wt % of $SiO_2$, 6.0-12.0 wt % of $B_2O_3$, 3.5-6.5 wt % of $Al_2O_3$; and the total amount of $Na_2O$, $K_2O$ and $Li_2O$ is 5.5-9.5 wt %; and the total amount of CaO, MgO and BaO is 1.0-5.5 wt %.

4. The borosilicate glass of claim 1, wherein the total amount of $Na_2O$, $K_2O$ and $Li_2O$ is 5.5-9.5 wt %; the total amount of CaO, MgO and BaO is 1.0-5.5 wt %; and the total amount of $SiO_2$, $TiO_2$ and $CeO_2$ is not less than 72.0 wt %.

5. The borosilicate glass of claim 1, wherein the amount of $CeO_2$ is 0.5-1.5 wt %.

6. The borosilicate glass of claim 1, wherein the amount of $CeO_2$ is 0.5-1.5 wt %, and the total amount of $SiO_2$, $TiO_2$, and $CeO_2$ is not less than 72.0 wt %.

7. The borosilicate glass of claim 1, wherein the amount of $CeO_2$ is 0.5-1.5 wt %, the amount of $SiO_2$ is 65.0-75.0 wt %, the amount of $B_2O_3$ is 6.0-12.0 wt %, the amount of $Al_2O_3$ is 3.5-6.5 wt %; and the total amount of $Na_2O$, $K_2O$ and $Li_2O$ is 5.5-9.5 wt %; and the total amount of CaO, MgO and BaO is 1.0-5.5 wt %.

8. The borosilicate glass of claim 1, wherein the amount of $CeO_2$ is 0.5-1.5 wt %, the amount of $SiO_2$ is 65.0-75.0 wt %, the amount of $B_2O_3$ is 6.0-12.0 wt %, the amount of $Al_2O_3$ is 3.5-6.5 wt %; and the total amount of $SiO_2$, $TiO_2$ and $CeO_2$ is not less than 72.0 wt %; the total amount of $Na_2O$, $K_2O$ and $Li_2O$ is 5.5-9.5 wt %; and the total amount of CaO, MgO and BaO is 1.0-5.5 wt %.

9. The borosilicate glass of claim 1, comprising the following constituents based on oxide:

| | |
|---|---|
| $SiO_2$ | 65.0-75.0 wt % |
| $B_2O_3$ | 6.0-12.0 wt % |
| $Al_2O_3$ | 3.5-6.5 wt % |
| $Na_2O$ | 4.5-8.5 wt % |
| $K_2O$ | 0-2.5 wt % |
| $Li_2O$ | 0-1.0 wt % |
| wherein $\Sigma(Na_2O + K_2O + Li_2O)$ | 5.5-9.5 wt % |
| CaO | 0.5-3.5 wt % |
| MgO | 0-1.0 wt % |
| BaO | 0-2.0 wt % |
| wherein $\Sigma(CaO + MgO + BaO)$ | 1.0-5.5 wt % |
| $TiO_2$ | 2.0-5.0 wt % |
| $CeO_2$ | 0.25-2.5 wt % |
| NaCl | 0-1.0 wt % |
| $Y_2O_3$ | 0.25-3.0 wt % |
| $ZrO_2$ | 0-4.0 wt % |
| ZnO | 0-2.0 wt % |
| $La_2O_3$ | 0-2.0 wt %. |

10. The borosilicate glass of claim 9, wherein the summation of the amounts of $SiO_2$, $TiO_2$ and $CeO_2$ is ≥72.0 wt %.

11. The borosilicate glass of claim 1, comprising the following constituents based on oxide:

| | |
|---|---|
| $SiO_2$ | 68.5-72.5 wt % |
| $B_2O_3$ | 8.0-10.0 wt % |
| $Al_2O_3$ | 4.1-5.9 wt % |
| $Na_2O$ | 5.5-7.0 wt % |
| $K_2O$ | 0-1.0 wt % |
| $Li_2O$ | 0-0.5 wt % |
| wherein $\Sigma(Na_2O + K_2O + Li_2O)$ | 6.0-8.0 wt % |
| CaO | 1.0-1.8 wt % |
| MgO | 0-0.8 wt % |
| BaO | 0.4-1.0 wt % |
| wherein $\Sigma(CaO + MgO + BaO)$ | 1.5-3.0 wt % |
| $TiO_2$ | 2.0-3.5% wt % |
| $CeO_2$ | 0.5-1.5 wt % |
| NaCl | 0-0.5 wt % |
| $Y_2O_3$ | 0.5-2.0 wt % |

-continued

| | |
|---|---|
| ZrO$_2$ | 0-2.0 wt % |
| ZnO | 0-1.0 wt % |
| La$_2$O$_3$ | 0-1.0 wt %. |

12. The borosilicate glass of claim 1, comprising the following constituents based on oxide:

| | |
|---|---|
| SiO$_2$ | 68.5-72.0 wt % |
| B$_2$O$_3$ | 8.0-10.0 wt % |
| Al$_2$O$_3$ | 4.6-5.9 wt % |
| Na$_2$O | 5.5-7.0 wt % |
| K$_2$O | 0-1.0 wt % |
| Li$_2$O | 0-0.5 wt % |
| wherein Σ(Na$_2$O + K$_2$O + Li$_2$O) | 6.0-8.0 wt % |
| CaO | 1.0-1.8 wt % |
| MgO | 0-0.8 wt % |
| BaO | 0.4-1.0 wt % |
| wherein Σ(CaO + MgO + BaO) | 1.5-3.0 wt % |
| TiO$_2$ | 2.0-3.0% wt % |
| CeO$_2$ | 0.5-1.2 wt % |
| NaCl | 0-0.5 wt % |
| Y$_2$O$_3$ | 0.5-2.0 wt % |
| ZrO$_2$ | 0-2.0 wt % |
| ZnO | 0-1.0 wt % |
| La$_2$O$_3$ | 0-1.0 wt %. |

13. The borosilicate glass of claim 1, further comprising at least one of ZrO$_2$, ZnO and La$_2$O$_3$ in an amount from 0-1.0 wt %.

14. The borosilicate glass of claim 1, having an ultraviolet-visible light transmittance T % less than 10% when the wavelength is ≤380 nm and a class 1 alkali resistance according to YBB00352004-2015.

15. The borosilicate glass of claim 1, having an ultraviolet-visible light transmittance T % less than 10% when the wavelength is ≤380 nm, a class 1 alkali resistance according to YBB00352004-2015, a class 1 water resistance according to YBB00362004-2015 and a class 1 acid resistance according to YBB00342004-2015.

16. A process comprising using the borosilicate glass of claim 1 to prepare a packaging material for a pharmaceutical; or a container or a chemical device for a chemically corrosive liquid; or a sealing glass for an alloy.

17. The borosilicate glass of claim 12, further comprising at least one of ZrO$_2$, ZnO and La$_2$O$_3$ in an amount from 0-1.0 wt %.

18. The borosilicate glass of claim 17, having an ultraviolet-visible light transmittance T % less than 10% when the wavelength is ≤380 nm, a class 1 alkali resistance according to YBB00352004-2015, a class 1 water resistance according to YBB00362004-2015 and a class 1 acid resistance according to YBB00342004-2015.

19. A process comprising using the borosilicate glass of claim 18 to prepare a packaging material for a pharmaceutical; or a container or a chemical device for a chemically corrosive liquid; or a sealing glass for an alloy.

* * * * *